UNITED STATES PATENT OFFICE.

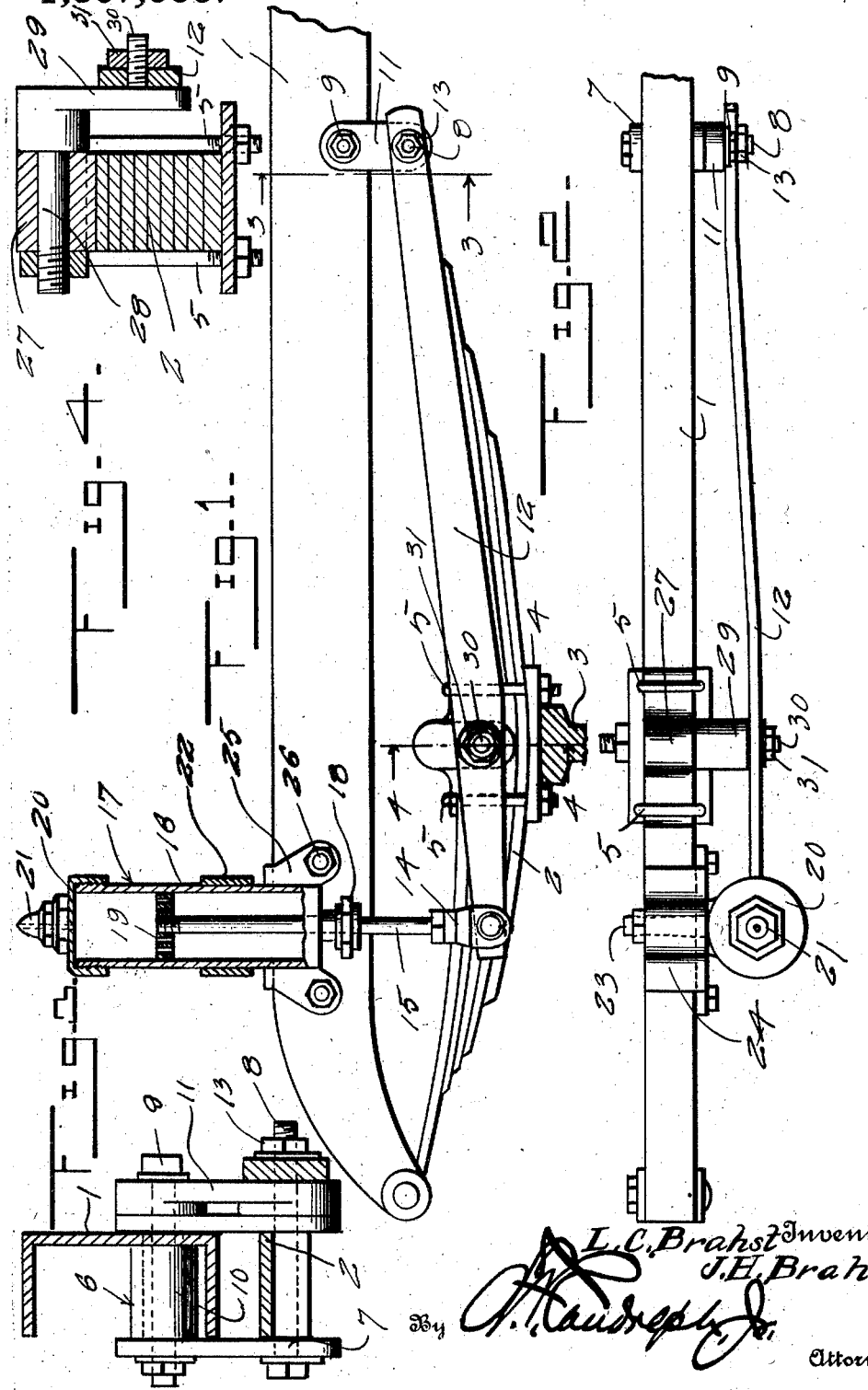

LOUIS C. BRAHST AND JULIUS H. BRAHST, OF HOBART, INDIANA.

SHOCK-ABSORBER.

1,307,955.     Specification of Letters Patent.    Patented June 24, 1919.

Application filed June 19, 1918. Serial No. 240,754.

*To all whom it may concern:*

Be it known that we, LOUIS C. BRAHST and JULIUS H. BRAHST, citizens of the United States, residing at Hobart, in the county of Lake and State of Indiana, have invented certain new and useful Improvements in Shock-Absorbers; and we do hereby declare the following to be a full, clear, and exact description of the invention, such as will enable others skilled in the art to which it appertains to make and use the same.

This invention relates to improvements in shock absorbers, and more particularly to a manner of connecting them to a vehicle and the springs thereof, and has for one of its objects the provision of means for permitting the shock absorber to move independently of the vehicle, thereby decreasing the liability of breaking the shock absorber on the vertical and horizontal movement of said vehicle when running over uneven ground.

Another object of this invention is the provision of means permitting the springing of the vehicle to contract without undue resistance thereto and to retard the rebound thereof.

A further object of this invention is the provision of a shock absorber of the above-stated character, which will be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of our invention, reference will be had to the following description and accompanying drawing, in which:

Figure 1 is a vertical sectional view of a shock absorber constructed in accordance with our invention.

Fig. 2 is a top plan view of the same,

Fig. 3 is a sectional view, taken on the line 3—3 of Fig. 1, and

Fig. 4 is a similar view, taken on the line 4—4 of Fig. 1.

Referring in detail to the drawing, the numeral 1 indicates a fragmentary portion of the chassis of an automobile or motor vehicle, having connected to its end, one end of a semi-elliptical spring 2, which is mounted upon the axle 3. A plate 4 is secured to the axle 3 in any well known manner and has connected thereto substantially U-shaped clamps 5, which surround the spring 2 for retaining the same upon the axle.

A spring shackle 6 consists of a pair of relatively spaced plates 7, connected by bolts 8 and 9. The bolt 9 is passed through the chassis 1, so as to position the plates upon each side of the chassis, and has mounted thereon a spacing collar 10 for spacing one of the plates 7 away from the inner face of the chassis. The bolt 8 is adapted to support the rear end of the spring 2 in the usual manner. A spacing plate 11 is mounted on the bolts 9 and 8 upon their outer ends for spacing a balancing lever 12 away from the spring 2. The balancing lever 12 has an opening in one end to receive the bolt 8, and is retained thereon by a nut 13. The balancing lever 12 extends substantially parallel with the spring 2 and terminates at its forward end at a point in advance of the axle 3, and has pivoted to this end a forked member 14, carried by a piston rod 15. The piston rod 15 extends into a cylinder 16 of a shock absorber 17 by way of a stuffing box 18, and has mounted thereon a perforated piston 19, which frictionally engages the walls of the cylinder 16. The upper end of the cylinder 16 is closed by a removable cap 20, provided with an oil or fluid filling opening, so that the cylinder 16 can be readily filled with fluid to act against the piston 19 during the movement thereof in the cylinder. The filling opening is normally closed by a removable plug 21.

A band 22 is secured to the cylinder 16 and has formed thereon a cylindrical extension 23 that is journaled in a bearing 24 mounted upon the chassis 1 adjacent its front end. The bearing 24 is provided with downwardly depending arms 25, which are secured to the side face of the chassis by bolts 26, whereby the cylinder 16 is mounted for oscillatory movement upon the chassis.

A bearing 27 is mounted upon the spring 2 and held thereon by the clamps 5, and has journaled therein a pin 28, carrying a downwardly depending arm 29. The arm 29 has formed thereon a screw threaded extension 30, which extends through an opening in the balancing lever 12, adjacent its forward end, or the portion that is directly over the axle 3, and is secured thereon by the nut 31, whereby the shock absorber 17 may move independently of the vehicle to which it is attached, thereby decreasing the liability of breaking the shock absorber upon sidewise or swaying movement of the vehicle when running fast over uneven roads. It is also to be noted that the various joints insure the continuous operation of the shock absorber under all conditions and eliminate bending or binding of the piston rod, and the binding of the piston head within the cylinder.

While we have shown and described the preferred embodiment of our invention, it will be understood that minor changes in construction, combination and arrangement of parts may be made without departing from the spirit and scope of the invention as claimed.

Having thus described our invention, what we claim is:

1. The combination with a vehicle including a chassis and a spring, a cylinder mounted on the chassis and capable of oscillatory movement in relation thereto, a piston for said cylinder, a bearing secured to said spring, an arm carried by said bearing, a balancing lever journaled on said arm adjacent one end thereof, means pivotally connecting the shortest end of the lever to the piston, and means pivotally connecting the longer end of the balancing lever to the chassis.

2. In combination, a chassis, a spring pivoted at its ends to the chassis, a lever pivoted at one end to one end of the spring, a retarding device pivoted to the chassis and to the other end of the lever, and a crank pivoted to the spring and to the lever intermediate the ends thereof.

3. In combination, a chassis, a spring connected to the chassis, a lever pivotally connected at one end to the chassis and spring, a crank pivoted to the spring and to the lever intermediate the ends thereof, and a retarding device connected to the chassis and to the other end of the lever.

4. In combination, the chassis of a vehicle, a spring pivoted at one end to the chassis, a shackle pivoted to the chassis and to the other end of the spring, a lever arranged in parallel relation to the spring and pivotally connected to said last named end thereof, a crank pivoted to the spring intermediate the ends thereof and to the lever intermediate the ends thereof, and a retarding device pivoted to the chassis and to the other end of said lever.

In testimony whereof we affix our signatures in presence of two witnesses.

LOUIS C. BRAHST.
JULIUS H. BRAHST.

Witnesses:
J. C. CAVENDER,
WM. KOSTBADE.